US 11,994,951 B2

(12) United States Patent
Hanna

(10) Patent No.: US 11,994,951 B2
(45) Date of Patent: May 28, 2024

(54) DEVICE RESET ALERT MECHANISM

(71) Applicant: Micron Technology, Inc., Boise, ID (US)

(72) Inventor: Stephen Hanna, Fort Collins, CO (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/738,645

(22) Filed: May 6, 2022

(65) Prior Publication Data

US 2023/0267047 A1 Aug. 24, 2023

Related U.S. Application Data

(60) Provisional application No. 63/313,139, filed on Feb. 23, 2022.

(51) Int. Cl.
*G06F 11/14* (2006.01)
*G06F 11/07* (2006.01)
*G06F 11/30* (2006.01)

(52) U.S. Cl.
CPC ........ *G06F 11/1441* (2013.01); *G06F 11/073* (2013.01); *G06F 11/0793* (2013.01); *G06F 11/3037* (2013.01); *G06F 11/3055* (2013.01); *G06F 11/3058* (2013.01); *G06F 2201/805* (2013.01)

(58) Field of Classification Search
CPC ............... G06F 11/1441; G06F 11/073; G06F 11/0793; G06F 11/3037; G06F 11/3055; G06F 11/3058; G06F 2201/805
See application file for complete search history.

(56) References Cited

U.S. PATENT DOCUMENTS

| 11,094,393 | B1* | 8/2021 | Alavoine | G11C 7/06 |
| 2021/0072924 | A1* | 3/2021 | Li | G06F 11/0757 |
| 2021/0191795 | A1* | 6/2021 | Misra | G06F 15/7807 |
| 2021/0326209 | A1* | 10/2021 | Hasegawa | G06F 11/0727 |
| 2021/0406143 | A1* | 12/2021 | Chaiken | G06F 11/1048 |
| 2022/0148674 | A1* | 5/2022 | Qiao | G11C 29/78 |
| 2022/0334920 | A1* | 10/2022 | Ho | G06F 11/0727 |
| 2022/0382611 | A1* | 12/2022 | Kapish | G06F 11/0709 |
| 2023/0026064 | A1* | 1/2023 | Kulkarni | G06F 16/2365 |
| 2023/0106369 | A1* | 4/2023 | Flynn | G06F 11/3409 718/103 |

* cited by examiner

*Primary Examiner* — Bryce P Bonzo
*Assistant Examiner* — Michael Xu
(74) *Attorney, Agent, or Firm* — Holland & Hart LLP

(57) ABSTRACT

Methods, systems, and devices for device reset alert mechanism are described. The memory system may identify a fault condition associated with resetting the memory system and set, in a register associated with event alerts of the memory system, a first indication for a reset of the memory system. In some cases, the memory system may transmit a message that includes a second indication that the register associated with event alerts of the memory system has been changed based on setting the register. The memory system may reset one or more components of the memory system based on the first indication and the second indication.

23 Claims, 6 Drawing Sheets

| Mode Value 405 | Message Description 415 | Byte ID 420 | Use 425 | Data Length 430 | Bit ID 435 |
|---|---|---|---|---|---|
| 0Eh | Fault Condition Status 410<br>Exception Event Status | 2 bytes | Read Only | D | 0000h | Bit 0: DYNCAP_NEEDED<br>Bit 1: SYSPOOL_EXHAUSTED<br>Bit 2: URGENT_BKOPS<br>Bit 3: TOO_HIGH_TEMP<br>Bit 4: TOO_LOW_TEMP<br>Bit 5: WRITEBOOSTER_FLUSH<br>Bit 6: PERFORMANCE_THROTTLING<br>Bit 7: RESET_NEEDED 440<br>Bit 8-15: Reserved |

DEVICE RESET ALERT MECHANISM

CROSS REFERENCE

The present Application for Patent claims the benefit of U.S. Provisional Patent Application No. 63/313,139 by Hanna, entitled "DEVICE RESET ALERT MECHANISM," filed Feb. 23, 2022, assigned to the assignee hereof, and expressly incorporated by reference herein.

FIELD OF TECHNOLOGY

The following relates to one or more systems for memory, including device reset alert mechanism.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

BRIEF DESCRIPTION OF THE DRAWINGS

FIG. 4 illustrates an example of a table that supports device reset alert mechanism in accordance with examples as disclosed herein.

DETAILED DESCRIPTION

Figure 1:
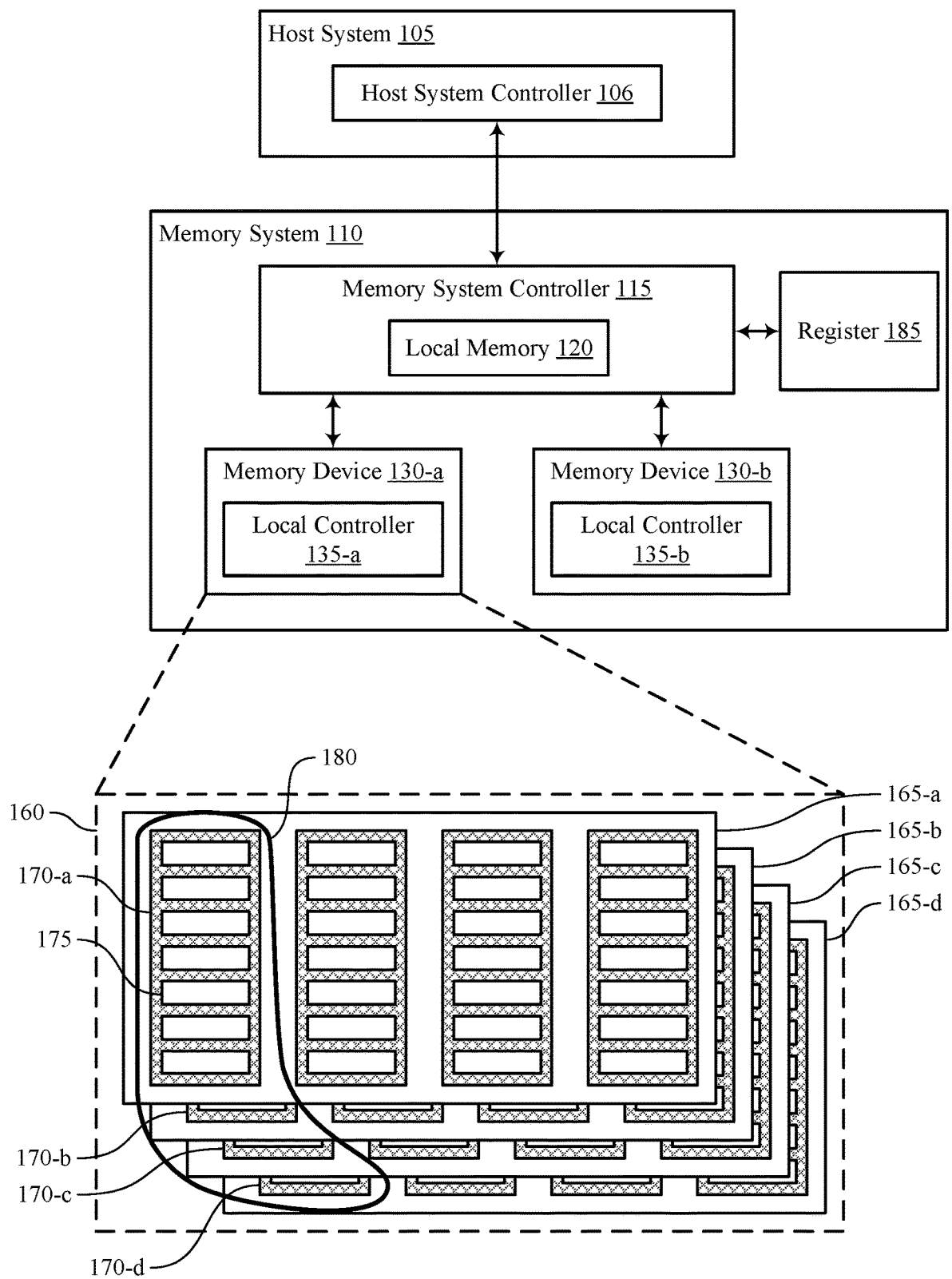
FIG. 1 illustrates an example of a system that supports device reset alert mechanism in accordance with examples as disclosed herein.

A memory system may experience a fault condition associated with resetting the memory system. After the memory system detects the fault condition, the memory system may be unable to efficiently and effectively alert the host system of the fault condition. If the fault condition occurs, the software or firmware (or hardware) of the memory system may cease functioning as expected (or may be hung-up). For example, the memory system may abort any outstanding or pending commands. If the memory system goes for a period of time without performing expected functions, the system may enter a time-out condition and trigger a recovery procedure. In some cases, the recovery procedure may be an example of a reset procedure.

For example, the fault condition (e.g., a message indicating the fault condition) may not be communicated to the host system, but rather the host system may perform a system check or remedial measures on the memory system. Once the time-out condition occurs, the host system may perform remedial operations (e.g., force hardware reset or perform a power cycle to the memory system) to cure the fault condition that may ail the memory system. In some cases, the memory system may retrieve debug information (e.g., an error history) to identify the fault condition but, the memory system may be unable to alert the host system of the fault condition. Identifying the fault condition associated with resetting the memory system without notifying the host system may decrease the efficiency of the memory system and increase a quantity of issues that may remain unaddressed, thereby decreasing the overall performance of the memory system and increasing a quantity of hardware and software complications associated with the memory system.

Identifying fault conditions associated with resetting the memory system without communicating the fault condition to the host system may increase the risk of hacking and other compromises to the system as a whole, which may have a variety of consequences including theft of information from the system, failure of various sub-systems of the system, increasing the power consumption, decreasing the efficiency and start-up time of performing operations (e.g., a lag time for application start-up), and decreasing the overall performance of the memory system. For example, the host system may be unresponsive or unaware of the status (e.g., state) of the memory system, which may allow the memory system to continue performing operations after the fault condition occurs, thereby increasing a quantity of complications caused by corrupted code and data. Such cases may pose a threat to the security and safety of the memory system.

Systems, devices, and techniques are described to improve security and safety of the memory system, thereby improving the overall efficiency and operations of the memory system. In some memory systems, techniques for providing a real-time reset request (e.g., message) to the host system upon detecting the fault condition associated with resetting the memory system are disclosed, thereby avoiding a delay in resetting the memory system. By communicating the fault condition associated with resetting the memory system instead of waiting for the time-out condition, the host system may be able to take remedial action before the time-out condition occurs, thereby improving the latency associated with the fault condition associated with resetting the memory system.

The memory system may set, in a register associated with event alerts of the memory system, a first indication for a reset of the memory system based on identifying the fault condition. In some cases, the memory system may transmit, to the host system, the message that includes a second indication that the register associated with event alerts of the memory system has been changed based on setting the register. The memory system may reset one or more components of the memory system based on the first indication and the second indication. In some examples, setting the first indication for a reset of the memory system and transmitting the message to the host system and may increase the reliability and security of the memory system, thereby allowing the memory system or other components to perform operations at improved speeds, efficiency, and performance.

Figure 2:
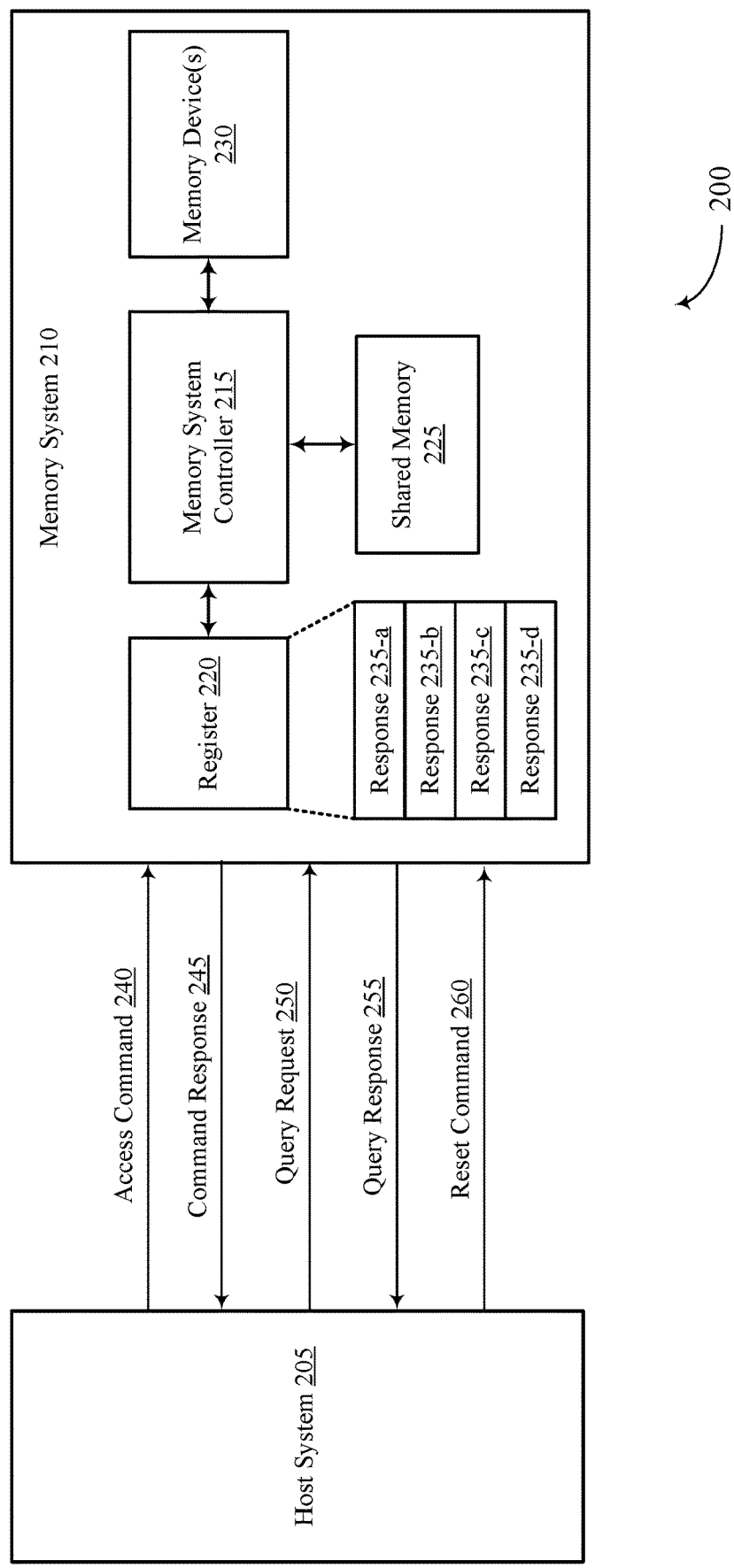
FIG. 2 illustrates an example of a system that supports device reset alert mechanism in accordance with examples as disclosed herein.

Features of the disclosure are initially described in the context of systems with reference to FIGS. 1-2. Features of the disclosure are described in the context of a flow diagram and a table with reference to FIGS. 3-4. These and other features of the disclosure are further illustrated by and described in the context of an apparatus diagram and a flowchart that relate to device reset alert mechanism with reference to FIGS. 5-6.

FIG. 1 illustrates an example of a system 100 that supports device reset alert mechanism in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support device reset alert mechanism. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The memory system may include a register 185. In some cases, the register 185 may store an indication (e.g., first indication) for a reset of the memory system 110. In such cases, the memory system 110 may set the first indication for reset of the memory system 110 in the register 185. The register 185 may be associated with event alerts of the memory system 110. In some cases, the register 185 may be coupled with and communicate with the memory system controller 115. The register 185 may be accessible by the host system 105 such that information in the register 185 may be read by both the host system 105 and the memory system 110. In some cases, the register 185 can be written to by the host system 105, the memory system 110, or both.

In some systems, to handle errors (e.g., fault conditions) of the memory system 110, the memory system 110 may abort all outstanding commands in transmission, thereby preventing the operation from occurring. In such cases, the memory system 110 may wait for a time-out condition in which the host system 105 may acknowledge the aborted commands and then the memory system 110 may reset the memory device 130. In some cases, the time-out condition may indicate, to the host system 105, to abort commands in transmission, thereby preventing the operation from occurring. Waiting for the time-out condition and performing a reset operation may decrease the efficiency of the memory system 110, thereby decreasing the overall performance of the memory system 110. In such cases, techniques may be desired to use an event alert mechanism to inform the host system 105 that the commands are aborted and to issue a reset of the memory system 110.

In some examples, the memory system 110 may communicate a presence of a particular condition (e.g., fault condition) that may affect the performance of the memory system 110. For example, the memory system 110 may identify a fault condition of the memory system 110. The fault condition may be associated with resetting the memory system 110. In some cases, the fault condition may be identified at a non-volatile memory device 130 of the memory system 110. The memory system 110 may set, in the register 185, a first indication for a reset of the memory system 110 based on identifying the fault condition. For example, the memory system 110 may set an event alert bit and upload additional information associated with the event alert bit to the register 185.

The memory system 110 may transmit, to the host system 105, a message indicating a second indication that that the register 185 has been changed based on setting the register 185. Alternatively, the memory system 110 may set an event alert bit in the register 185 after sending the separate message (e.g., over a channel). The memory system 110 may reset one or more components of the memory system 110 based on the first indication and the second indication. By transmitting the message to the host system 105 and setting the register 185, the memory system 110 may experience increased recovery times in response to the fault condition associated with resetting the memory system 110, an increased efficiency in preventing future fault conditions, and increased efficiency of resetting the memory system 110.

FIG. 2 illustrates an example of a system 200 that supports device reset alert mechanism in accordance with examples as disclosed herein. The system 200 includes a host system 205 coupled with a memory system 210, which may be respective examples of a host system 105 and memory system 110 as described in reference to FIG. 1. The memory system 210 may include a register 220, a memory system controller 215, memory devices 230, and a shared memory 225, which may be respective examples of a register 185, a memory system controller 115, and memory devices 130 as described in reference to FIG. 1.

A challenge with some memory systems 210 is if the memory system 210 becomes unresponsive to a host system 205. If the memory system 210 becomes unresponsive, the host system 205 may implement time-out operations (e.g., a reset operation or a power cycle) to reset the memory system 210 and continue with normal operations. Memory systems 210 may become unresponsive for a variety of reasons referred to as fault conditions that may include, but are not limited to, the firmware being stuck, a hardware exception occurring, a critical operating condition of the memory system, a fatal error in the memory system, or a combination thereof.

In some cases, the fault condition may not be communicated to the host system 205, but rather the host system 205 may wait for a time-out condition to check for an issue or to reset the memory system 210. To address the inefficiencies associated with bypassing communication to the host system 205 regarding the fault condition, the memory system 210 may communicate to the host system 205 that the memory system 210 identifies the fault condition associated with resetting the memory system. For example, if the fault condition prevents the command from being executed by the memory system, the memory system 210 may transmit an indication the host system 205 and set an indication in a register 20 of the memory system 210. In such cases, the memory system 210 may address the fault condition at the time of the occurrence and prevent future fault conditions from occurring.

In some cases, the host system 205 may transmit, to the memory system 210, an access command 240 to access one or more memory cells of the memory device 230. The memory system 210 may identify the fault condition at a memory device 230 of the memory system 210 that is associated with resetting the memory system 210 based on receiving the access command 240. In some cases, the memory device 230 may be an example of a non-volatile memory device that includes NAND devices. In some examples, the memory system controller 215 may detect the fault condition associated with resetting the memory system 210. For example, the fault condition may prevent the access command 240 from being executed by the memory system 210. In such cases, the host system 205 may identify the time-out condition in response to having the memory system 210 fail to perform at least some expected action (e.g., the access command 240) for duration of time (e.g., a time-out timer expires). For example, the host system 205 may not receive a message (e.g., response) from the memory system 210 within a duration of time from transmitting the access command 240. In such cases, the host system 205 may determine that the memory system 210 may be having problems or has experienced a fault condition.

In some cases, the time-out condition may occur independently of identifying whether the memory system 210 identifies a fault condition. In some examples, a host system 205 may maintain a time-out timer that may be reset after one or more operations occur. Thus, during normal operation of the memory system 210, the time-out timer may not expire because it is getting reset fairly frequently. If the time-out timer fails to get reset, upon expiration of the timer (e.g., the time-out condition), the host system 205 may issue a command for the memory system 210 to be reset or be power cycled. In some examples, the memory system 210 may identify the time-out condition in response to identifying the fault condition.

After the time-out condition occurs, the host system 205 may perform remedial measures (e.g., perform a power cycle on the memory system 210) to address the conditions that impede the performance of the memory system 210. However, the host system 205 may be unaware of the conditions that occurred to cause the time-out condition. In some cases, the fault condition may not be communicated to the host system 205, but rather the host system 205 may perform the time-out condition (e.g., a power cycle) to refresh the memory system 210.

In some cases, the memory system 210 may retrieve debugging information from a fault history report of the memory system 210 in response to identifying the fault condition. The information associated with the fault condition may be an example of the debugging information. For example, the memory system 210 may detect a late or missing command from the host system 205 or detect noise associated with the memory system 210. In such cases, the memory system 210 may retrieve a history log of events (e.g., fault conditions) stored in a shared memory 225 of the memory system 210. The history log may include a quantity of times the memory system 210 recovered data or a quantity of times the memory system 210 was refreshed. In some cases, the memory system 210 may set the first indication in response to retrieving the debugging information.

The memory system 210 may set, in the register 220, a first indication for a reset of the memory system 210 based on identifying the fault condition. The register 220 may be associated with event alerts of the memory system 210. In some cases, the memory system 210 may allocate bit 7 of an events exception mode register (e.g., register 220) to indicate that the host system 205 is to reset the memory system 210. The register 220 may be used to communicate one or more events exceptions. For example, bit values 0-6 of the register 220 may be associated with events different than the fault condition described herein. In some cases, the memory system controller 215 may allocate bit 7 to indicate that the host system 205 is to reset the memory system 210. In some examples, in response to allocating bit 7 to indicate that the host system 205 is to reset the memory system 210, the memory system controller 215 may perform one or more actions to prepare the memory system 210 for reset. For example, the memory system 210 may store parameter information about an operation of the memory system 210 based on setting the first indication and before receiving the reset command 260 from the host system 205 to reset the memory system 210. In such cases, storing parameter information may be an example of a panic dump.

The register 220 may include responses 235. For example, the register 220 may include response 235-a, 235-b, 235-c, and 235-d. If the memory system 210 receives the access command 240 to access one or more memory cells, the memory system 210 may choose one of four responses 235 to transmit to the host system 205. For example, responses 235 may be an example of outstanding commands at the memory system 210. During a device reset alert mechanism, the memory system 210 may set an event alert bit in the register 220. In such cases, the memory system 210 may select one of the responses 235 and set an event alert bit in the response 235. For example, the memory system 210 may set an event alert bit in the response 235-a. In some cases, the memory system 210 may use the device information field of the response 235 to indicate an event alert. For example, the memory system 210 may set the first indication (e.g., event alert bit) in the register 220 to notify the host system 205 that the memory device 230 experienced an error and is requesting the memory system 210 restart to recover. In such cases, the first indication requests that the host system 205 performs the reset of the memory system 210.

The memory system 210 may transmit a command response 245 in response to setting the first indication in the register 220. In some cases, the memory system 210 may transmit the command response 245 in response to entering the time-out condition. The host system 205 may receive, from the memory system 210, the command response 245. The command response 245 may be an example of a message that includes a second indication that the register 220 has been changed. In some cases, the command response 245 may include the device information and the event alert bit. In such cases, the command response 245 may include the selected response 235. In some cases, the command response 245 may include a response to a command pending at the memory system 210. To alert the host system 205 of an active status event, the memory system 210 may set the event alert bit (e.g., bit 7) and transmit the command response 245 indicating the event alert bit. In such cases, the command response 245 may include the contents of the register 220. For example, the command response 245 may include bit 7.

By the memory system 210 transmitting the command response 245 that indicates the second indication in real-time (e.g., at the time that the fault condition occurs) and setting the first indication in the register, the memory system 210 may prevent the host system 205 from entering the time-out condition, which may increase inefficiencies of the memory system 210 by increasing the power and energy consumption. In some cases, providing real-time fault condition reporting may improve error management, reduce test firmware releases to detect error conditions, and allow a safe state (e.g., safe mode of operation) for the host system 205 to communicate with the memory system 210 in case a fault condition occurred. In such cases, transmitting the message (e.g., the command response 245) to the host system 205 may accelerate the failure analysis to identify the causes of the fault condition, thereby allowing the memory system 210 to quickly address the fault condition, improve latency in error handling, and prevent future fault conditions from occurring. By setting the first indication in the register 220 and sending the command response 245, the memory system 210 may notify the host system 205 of a fault condition associated with resetting the memory system 210 and request a reset from the host system 205.

The host system 205 may receive the command response 245 and generate a query request 250. The query request 250 may include a request for the exception event status (e.g., information stored in the register 220). For example, the query request 250 may include a request to read an attribute of the memory system 210 (e.g., an exception event status attribute as discussed with reference to FIG. 4). In some cases, the query request 250 may request the memory system 210 to transmit contents of the register 220 associated with event alerts of the memory system 210. In such cases, the query request 250 may request that the memory system identify and notify the host system 205 of the exception event status (e.g., including additional information associated with the fault condition). In response to receiving the command response 245, the host system 205 may transmit, to the memory system 210, the query request 250.

The memory system 210 receive the query request 250. In response to receiving the query request 250, the memory system 210 may generate the query response 255. The query response 255 may include the exception event status and the reset alert. For example, the query response 255 may include the contents of the register 220. The memory system 210 may transmit, to the host system 205, the query response 255 in response to receiving the query request 250.

In such cases, the host system 205 may receive the query response 255. The host system 205 may determine that the memory system 210 is requesting a reset in response to receiving the query response 255. By receiving the query response 255, the host system 205 may determine that some or all outstanding commands of the memory system 210 are aborted and that the memory system 210 is requesting a reset. The host system 205 may generate the reset command 260 in response to receiving the query response 255. In some cases, the reset command 260 may include instructions to reset the one or more components of the memory system 210. In some examples, the reset command 260 may include a message requesting that the memory system 210 reset the one or more components.

The host system 205 may transmit, to the memory system 210, the reset command 260 in response to receiving the query response 255. The memory system 210 may receive the reset command 260 and reset one or more components of the memory system 210. In some cases, the host system 205 may reset the internal pointers of the host system 205 and reset the interface of the memory system 210. After resetting one or more components of the memory system 210, a bus coupled between the host system 205 and the memory system 210 may be synchronized. In such cases, the memory system 210 may perform a recovery procedure to update the memory system 210 with any unmapped user data.

Figure 3:
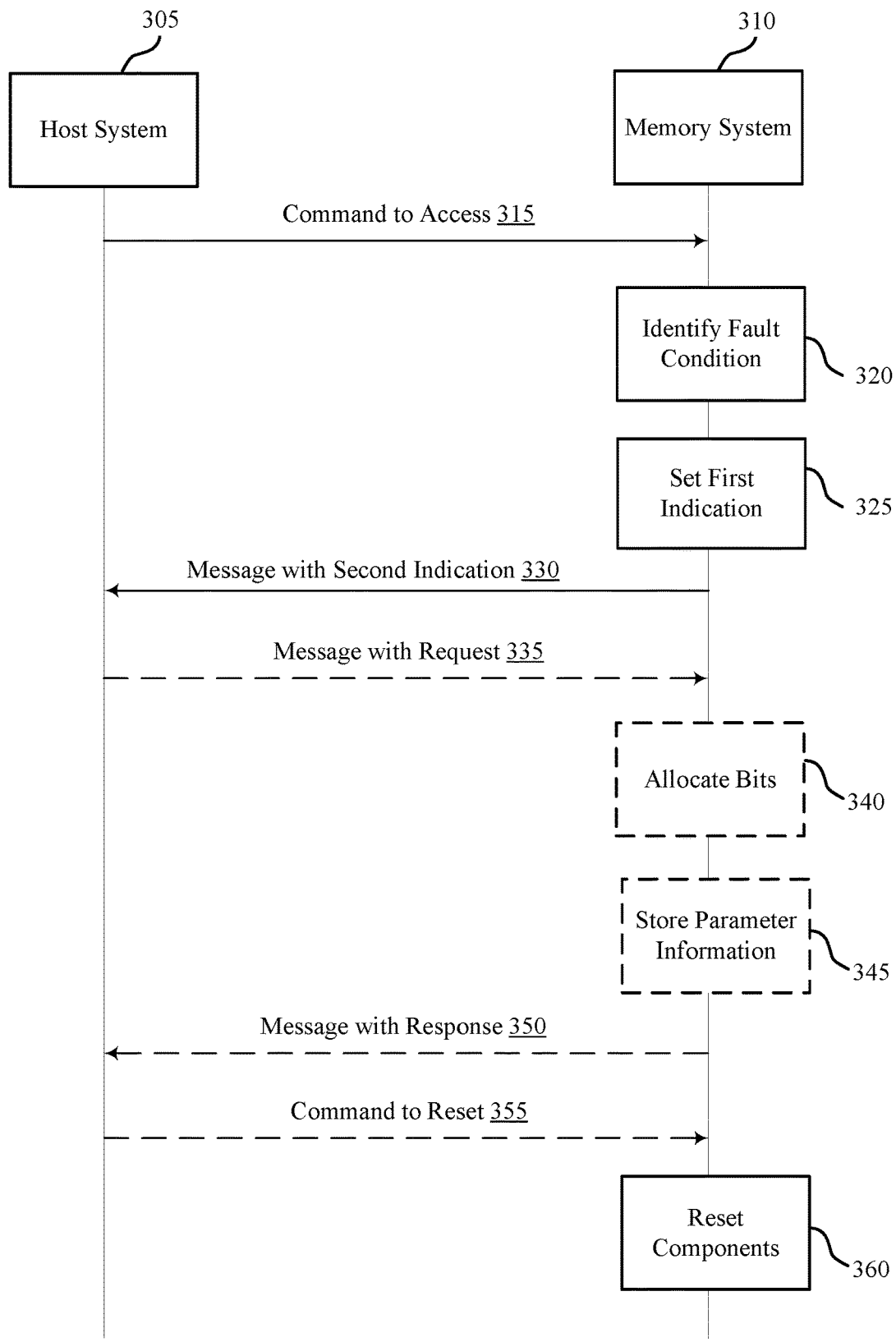
FIG. 3 illustrates an example of a flow diagram that supports device reset alert mechanism in accordance with examples as disclosed herein.

FIG. 3 illustrates an example of a flow diagram 300 that supports device reset alert mechanism in accordance with examples as disclosed herein. Flow diagram 300 may include host system 305 and memory system 310, which may be respective examples of a host system and memory system as described in reference to FIGS. 1 and 2. Alternative examples of the following may be implemented, where some steps are performed in a different order or not at all. Some steps may additionally include additional features not mentioned below. The flow diagram 300 illustrates techniques where a memory system 310 identifies a fault condition associated with resetting the memory system 310.

Aspects of the flow diagram 300 may be implemented by a controller, among other components. Additionally or alternatively, aspects of the flow diagram 300 may be implemented as instructions stored in memory (e.g., firmware stored in a memory coupled with the memory system 310). For example, the instructions, if executed by a controller (e.g., the memory system controller 115), may cause the controller to perform the operations of the flow diagram 300.

At 315, a command to access may be received. For example, the host system 305 may transmit an access command, and the memory system 310 may receive the access command prior to identifying a fault condition. In such cases, the memory system 310 may receive, from the host system 305, a command to access one or more memory cells. In some cases, the fault condition may prevent the command to access from being executed by the memory system 310.

At 320, the fault condition may be identified. For example, the memory system 310 may identify the fault condition at a non-volatile memory device of the memory system 310 that is associated with resetting the memory system 310. In such cases, the fault condition may be associated with resetting the memory system 310. In some examples, the fault condition may be an example of a stuck condition of firmware of the memory system 310.

The memory system 310 may detect the fault condition associated with resetting the memory system 310 and identify information associated with the fault condition in response to identifying the fault condition. The information associated with the fault condition may include a time at which the fault condition associated with resetting the memory system occurred, a duration of the fault condition associated with resetting the memory system, or both. In such cases, the memory system 310 may detect the fault condition associated with resetting the memory system and detect additional information associated with the fault condition (i.e., time, duration) to transmit additional information to the host system 305.

At 325, a first indication may be set. For example, the memory system 310 may set, in a register associated with event alerts of the memory system 310, a first indication for a reset of the memory system 310 based on identifying the fault condition. In such cases, the memory system 310 may set, in the register associated with the memory system 310, the first indication in response to identifying the fault condition. The memory system 310 may set an event alert in a register. In such cases, the first indication may be an example of an event alert bit. The first indication may request that a host system 305 perform the reset of the memory system 310.

In some cases, the first indication may indicate a type of the fault condition. For example, the first indication may indicate that the fault condition is associated with resetting the memory system 310. In some cases, the first indication may indicate the information associated with the fault condition associated with resetting the memory system 310. For example, a bit may be set to indicate the type of fault condition and information associated with the fault condition. In some examples, the first indication may be set before transmitting the message with the second indication. In other examples, the first indication may be set in response to transmitting the message with the second indication.

At 330, a message may be transmitted. For example, the memory system 310 may transmit, to the host system 305, the message that includes the second indication that the register associated with event alerts of the memory system has been changed based on setting a register. In such cases, the host system 305 may receive, from the memory system 310, the message that includes the second indication. In some cases, transmitting the message may include transmitting a command response associated with the command. In such cases, the command response may include the second indication. The second indication may be an example of the device information with the event alert. In some examples, the message may include a response to a command pending at the memory system 310. In some cases, the memory system 310 may transmit the message in response to setting the first indication. In such cases, the memory system 310 may transmit the message after setting the first indication. In other examples, the memory system 310 may transmit the message before setting the first indication.

The message may include an information field (e.g., device information field) that indicates the second indication. The second indication may include an event alert bit. For example, the event alert bit may be set to "1" to indicate that the fault condition associated with resetting the memory system 310 exists in the memory system 310. In other examples, the event alert bit may be set to "0" to indicate that the fault condition associated with resetting the memory system 310 may not exist in the memory system 310. In such cases, the memory system 310 may set the event alert bit (e.g., bit 0 in device information field of the message) to trigger a failing response to an outstanding or future command from the host system 305. The message may then be transmitted over a bus from the memory system 310 and to the host system 305 after the memory system 310 sets the first indication in the register. In some cases, the message may be transmitted before the memory system 310 sets the first indication in the register.

Enabling the memory system 310 to communicate the fault condition at the time of occurrence may prevent the host system 305 from periodically checking the error history, thereby reducing the error checking and avoiding the risk that, due to limited resources, the information may have been discarded. In some cases, immediately signaling to the host system 305 the existence of a fault condition associated with resetting the memory system 310 may reduce recovery time and improve the operations of the memory system 310. In some cases, the fault condition may be addressed via a reset operation (e.g., recovery procedure). In such cases, the fault condition may prevent the firmware from operating and cause the memory system 310 to reset.

At 335, a message with a request may be received. For example, the memory system 310 may receive, from a host system 305, a second message requesting the memory system 310 to transmit contents of the register associated with event alerts of the memory system 310 to the host system 305. In such cases, the host system 305 may generate a second message and transmit the second message requesting the memory system 310 to transmit contents of the register associated with event alerts of the memory system 310 to the host system 305. In some cases, the second message may be an example of a query request. In such cases, the memory system 310 may request a query request from the host system 305.

At 340, bits may be allocated. For example, a bit of the register associated with event alerts of the memory system 310 may be dedicated to indicating whether the memory system 310 requests a host system 305 to perform a reset of the memory system 310. In such cases, the memory system 310 may allocate bit 7 of the register for a reserved error (e.g., a fault condition associated with resetting the memory system 310). In some examples, the memory system 310 may allocate bit 7 of the register at a same time as setting the first indication. In such cases, the memory system 310 may allocate the bits prior to sending the message with the second indication. In other examples, the memory system 310 may allocate bits after sending the message with the second indication and/or receiving the message with the request.

In some examples, the memory system 310 may dedicate one or more additional bits of the register. For example, a first bit of the register may dedicated to requesting that a host system remove some resources from a physical memory resources pool serving a logical address space of logical units, a second bit of the register may be dedicated to indicating that a capacity of a storage area associated with system data of the memory system 310 is consumed, and a third bit of the register may be dedicated to indicating that a level of usage of resources associated with background operations of the memory system 310 is above a threshold. In some cases, a fourth bit of the register may be dedicated to indicating that a temperature of the memory system 310 is above a first threshold, and a fifth bit of the register may be dedicated to indicating that the temperature of the memory system 310 is below a second threshold. In some examples, sixth bit of the register may be dedicated to indicating that a capacity of a write booster is consumed, and a seventh bit of the register may be dedicated to indicating that the memory system 310 is operating at a reduced performance.

At 345, parameter information may be stored. For example, the memory system 310 may store parameter information about an operation of the memory system 310 based on setting the first indication. In some cases, the memory system 310 may store parameter information about an operation of the memory system 310 before receiving a command from a host system 305 to reset the memory system 310. In such cases, storing the parameter information may occur before the memory system 310 is reset. The storage of parameter information about an operation of the memory system 310 may be an example of panic dump. In such cases, the memory system 310 may perform a panic dump before resetting the memory system 310.

The panic dump may be an example of collecting information about an operation of the memory system and saving the information into a standard format for the host system 305 to read. In such cases, the host system 305 may determine health type information associated with the operation of the memory system 310. The host system 305 may read the information after the one or more components of the memory system 310 are reset. Performing the panic dump prior to resetting the one or more components of the memory system 310 may decrease the processing times and improve the performance of the memory system 310. In some cases, the memory system 210 may store the parameter information prior to transmitting the message with the second indication. In other examples, the memory system 210 may store the parameter information after transmitting the message with the second indication and/or receiving the message with the request. In some cases, performing the panic dump may be part of a reset operation of the memory system 310. By performing the panic dump prior to receiving the command to reset (at 355), the latency for performing the reset operation may be further reduced.

At 350, a message with a response may be transmitted. For example, the memory system 310 may transmit, to the host system 305, a third message that includes the contents of the register based on receiving the second message requesting the memory system 310 to transmit contents of the register associated with event alerts of the memory system 310 to the host system 305. In such cases, the host system 305 may receive the third message includes the contents of the register. The third message may be an example of a query response. In such cases, the memory system 310 may transmit a query response to the host system 305. The host system 305 may use the information in the message to determine whether a reset of the memory system 310 is to be performed.

At 355, a command to reset may be received. For example, the memory system 310 may receive, from the host system 305, a fourth message requesting that the memory system 310 reset the one or more components based on transmitting the third message. The host system 305 may generate the fourth message and transmit the fourth message requesting that the memory system 310 reset the one or more components based on receiving the third message. The fourth message may be an example of a reset request. In such cases, the memory system 310 may receive a reset request from the host system 305.

At 360, components may be reset. For example, the memory system 310 may reset one or more components of the memory system 310 based on the first indication and the second indication. The one or more components of the memory system 310 may be an example of the non-volatile memory device. The non-volatile memory device may include a NAND memory device. In such cases, the memory system 310 may reset a NAND memory device of the non-volatile memory device based on the first indication and the second indication.

In some cases, resetting the one or more components may be based on receiving the second message requesting the memory system 310 to transmit contents of the register associated with event alerts of the memory system 310 to the host system 305. In other examples, resetting the one or more components of the memory system may be based on storing the parameter information (e.g., performing the panic dump). In some cases, resetting the one or more components may be based at least in part on transmitting the third message that includes the contents of the register, receiving the fourth message requesting that the memory system 310 reset the one or more components, or both.

FIG. 4 illustrates an example of a table 400 that supports device reset alert mechanism in accordance with examples as disclosed herein. The table 400 may represent bits of a register used to store at least a first indication and communicate additional information about a fault condition between a host system and a memory system. The table 400 may include a mode value 405, a fault condition status 410, a message description 415, a byte ID 420, use 425, data length 430, and bit ID 435.

The fault condition status 410 may include an exception event status. In some cases, a fault condition may be an example of an exception event. An exception event mechanism may be used by the memory system to report an occurrence of some events (e.g., fault conditions) to the host system. In some cases, the exception event mechanism may be used by the memory system to report an occurrence of a fault condition associated with resetting the memory system to the host system. For example, the exception event mechanism may include an event alert bit, a fault condition status 410 (e.g., an exception event status attribute), and a fault condition control attribute (e.g., an exception event control attribute). A bit in the fault condition status 410 may be assigned to each fault condition. For example, the bit of the fault condition status 410 may be set to "0" to indicate that the corresponding fault condition is inactive (e.g., does not exist in the memory system). A bit of the fault condition status 410 may be set to "1" to indicate that the corresponding fault condition is active (e.g., exists in the memory system). In such cases, the bit of the fault condition status 410 may be set to "1" to indicate that the fault condition associated with resetting the memory system is active.

The fault condition control attribute may include a bit that is assigned to each fault condition. In such cases, the fault condition control attribute may include a bit that is assigned to the fault condition associated with resetting the memory system. For example, the bit in the fault condition control attribute and a bit in the fault condition status 410 may both be set to "1." In such cases, the event alert bit included in the device information field of the message may be set to "1." In other examples, the bit in the fault condition control attribute may be set to "0," and the bit in the fault condition status 410 may be set to "1." In such cases, the event alert bit included in the device information field of the message may be set to "0."

The event alert bit may be an example of the logical OR of bits in the fault condition status 410 masked by the bits of the fault condition control attribute. The event alert bit may be set to "1" in response to at least one bit in the fault condition status 410 and at least one bit in the fault condition control attribute being set to "1." After the memory system addresses the fault condition (e.g., resetting one or more components of the memory system), the bits of the fault condition control attribute, fault condition status 410, and event alert bit may be cleared (e.g., reset).

The bit ID 435 associated with the fault condition status 410 may indicate the fault condition. Each bit in the bit ID 435 may be mapped to different fault conditions. The fault condition may be an example of an operating condition of the memory system that satisfies a threshold (e.g., a dynamic device capacity), a capacity operation of the memory system (e.g., a system pool exhausted), a background operation, a temperature detection operation, a performance throttling, a flush operation (e.g., write booster buffer flush), and a reset operation. Bit 0 of bit ID 435 may indicate that the fault condition is a dynamic device capacity. In such cases, the memory system may request a dynamic capacity operation. For example, a first bit (e.g., bit 0) of the register may be dedicated to requesting that a host system remove some resources from a physical memory resources pool serving a logical address space of logical units. The bit may be cleared after the dynamic capacity operation is complete, thereby releasing the capacity of the memory system requested to be released.

In some examples, bit 1 of bit ID 435 may indicate that the fault condition is the system pool exhausted. In such cases, a quantity of resources to address host data as system data may be below a threshold. For example, a second bit (e.g., bit 1) of the register may be dedicated to indicating that a capacity of a storage area associated with system data of the memory system is consumed. The bit may be cleared after the host system transforms a system data area of the memory system to a non-system data area. Bit 2 of bit ID 435 may indicate that the fault condition is the background operation. In such cases, the memory system may transmit a request, to the host system, during performance of a background operation. For example, a third bit (e.g., bit 2) of the register may be dedicated to indicating that a level of need associated with background operations of the memory system is above a threshold. The bit may be cleared after the background operation status returns to 00h or 01h.

In other examples, bit 3 of bit ID 435 may indicate that the fault condition is the temperature detection that may be above a threshold (e.g., satisfies the threshold). For example, a fourth bit (e.g., bit 3) of the register may be dedicated to indicating that a temperature of the memory system is above a first threshold. In such cases, the memory system may transmit a request, to the host system, to reduce the temperature of the memory system. Bit 4 of bit ID 435 may indicate that the fault condition is the temperature detection that may be below the threshold (e.g., satisfies the threshold). For example, a fifth bit (e.g., bit 4) of the register may be dedicated to indicating that the temperature of the memory system is below a second threshold. In such cases, the memory system may transmit a request, to the host system, to increase the temperature of the memory system.

Bit 5 of bit ID 435 may indicate that the fault condition is the write booster buffer flush. For example, a sixth bit (e.g., bit 5) of the register may be dedicated to indicating that a capacity of a write booster is consumed. In such cases, the host system may issue a flush command, and the memory system may set a bit to "1," thereby indicating to the memory system to perform a flush operation on the buffer for the write booster. In some cases, bit 6 of bit ID 435 may indicate that the fault condition is the performance throttle. For example, a seventh bit (e.g., bit 6) of the register may be dedicated to indicating that the memory system is operating at a reduced performance. The host system may read the fault condition status 410 and determine a cause of the reduced performance.

Bit indication 440 may be an example of bit 7 of bit ID 435. Bit indication 440 may indicate that the fault condition is associated with resetting the memory system. For example, bit indication 440 may be an example of a bit of the register associated with event alerts of the memory system that is dedicated to indicating whether the memory system requests a host system to perform a reset of the memory system. In such cases, the memory system may set bit indication 440 to "1," thereby indicating to the memory system to request that the host system perform a reset of the memory system.

Bits 8 through 15 may be reserved and may indicate other fault conditions. For example, bits 8 through 15 may indicate the fault condition is a hardware exception associated with the memory system, a stuck condition of firmware of the memory system, a voltage detection operation, an uncorrectable error, or a combination thereof. In some cases, bits 8-15 may be reserved and those bits can be used to communicate the additional fault conditions described herein. In some cases, at least some of bits 8-15 may be mapped to fault conditions. For example, a bit may be mapped to indicate a stuck condition of the firmware of the memory system, an occurrence of a hardware exception associated with the memory system, an occurrence of an operating condition (e.g., critical operating condition) of the memory system, and an occurrence of an error associated with the memory system. In some cases, the information set in the register may indicate an occurrence of a capacity operation of the memory system, an occurrence of a resource limitation of the memory system, an occurrence of a background operation, an occurrence of a temperature detection operation, an occurrence of a flush operation, or a combination thereof.

Figure 5:
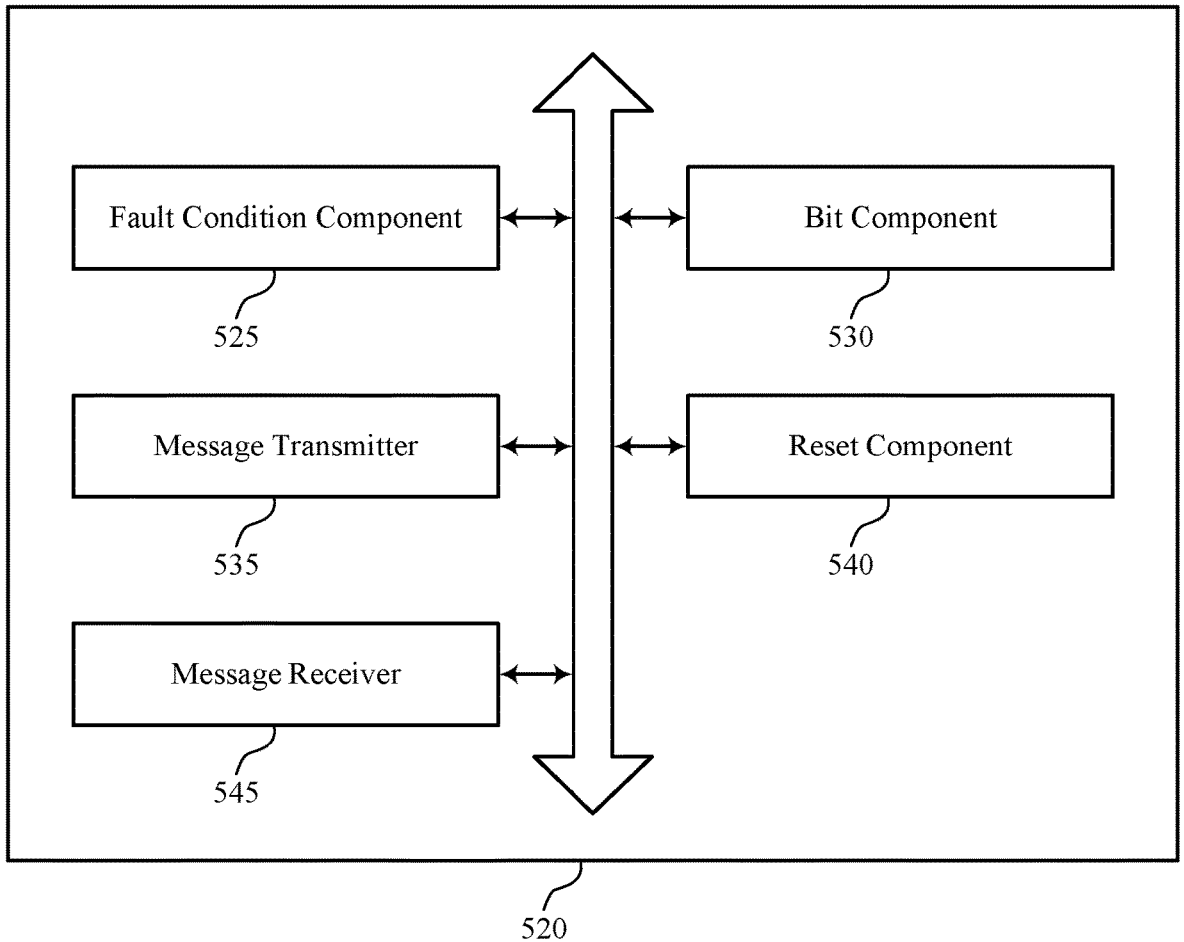
FIG. 5 shows a block diagram of a memory system that supports device reset alert mechanism in accordance with examples as disclosed herein.

FIG. 5 shows a block diagram 500 of a memory system 520 that supports device reset alert mechanism in accordance with examples as disclosed herein. The memory system 520 may be an example of aspects of a memory system as described with reference to FIGS. 1 through 4. The memory system 520, or various components thereof, may be an example of means for performing various aspects of device reset alert mechanism as described herein. For example, the memory system 520 may include a fault condition component 525, a bit component 530, a message transmitter 535, a reset component 540, a message receiver 545, or any combination thereof. Each of these components may communicate, directly or indirectly, with one another (e.g., via one or more buses).

The fault condition component 525 may be configured as or otherwise support a means for identifying a fault condition at a non-volatile memory device of the memory system that is associated with resetting the memory system. The bit component 530 may be configured as or otherwise support a means for setting, in a register associated with event alerts of the memory system, a first indication for a reset of the memory system based at least in part on identifying the fault condition. The message transmitter 535 may be configured as or otherwise support a means for transmitting a message that includes a second indication that the register associated with event alerts of the memory system has been changed based at least in part on setting the register. The reset component 540 may be configured as or otherwise support a means for resetting one or more components of the memory system based at least in part on the first indication and the second indication.

In some examples, the bit component 530 may be configured as or otherwise support a means for storing parameter information about an operation of the memory system based at least in part on setting the first indication and before receiving a command from a host system to reset the memory system, where resetting the one or more components of the memory system is based at least in part on storing the parameter information.

In some examples, storing the parameter information occurs before the memory system is reset.

In some examples, a bit of the register associated with event alerts of the memory system is dedicated to indicating whether the memory system requests a host system to perform a reset of the memory system.

In some examples, a first bit of the register is dedicated to requesting that a host system remove some resources from a physical memory resources pool serving a logical address space of logical units. In some examples, a second bit of the register is dedicated to indicating that a capacity of a storage area associated with system data of the memory system is consumed. In some examples, a third bit of the register is dedicated to indicating that a level of need associated with background operations of the memory system is above a threshold. In some examples, a fourth bit of the register is dedicated to indicating that a temperature of the memory system is above a first threshold. In some examples, a fifth bit of the register is dedicated to indicating that the temperature of the memory system is below a second threshold. In some examples, a sixth bit of the register is dedicated to indicating that a capacity of a write booster is consumed. In some examples, a seventh bit of the register is dedicated to indicating that the memory system is operating at a reduced performance.

In some examples, the message receiver 545 may be configured as or otherwise support a means for receiving, from a host system, a second message requesting the memory system to transmit contents of the register associated with event alerts of the memory system to the host system, where resetting the one or more components is based at least in part on receiving the second message.

In some examples, the message transmitter 535 may be configured as or otherwise support a means for transmitting, to the host system, a third message that includes the contents of the register based at least in part on receiving the second message, where resetting the one or more components is based at least in part on transmitting the third message.

In some examples, the message receiver 545 may be configured as or otherwise support a means for receiving, from the host system, a fourth message requesting that the memory system reset the one or more components based at least in part on transmitting the third message, where resetting the one or more components is based at least in part on receiving the fourth message.

In some examples, the message receiver 545 may be configured as or otherwise support a means for receiving, from a host system, a command to access one or more memory cells, where the fault condition prevents the command from being executed by the memory system, where transmitting the message includes transmitting a command response associated with the command, the command response including the second indication.

In some examples, the message includes a response to a command pending at the memory system.

In some examples, the one or more components reset by the memory system includes the non-volatile memory device.

In some examples, the non-volatile memory device includes a NAND memory device.

In some examples, the first indication requests that a host system perform the reset of the memory system.

Figure 6:
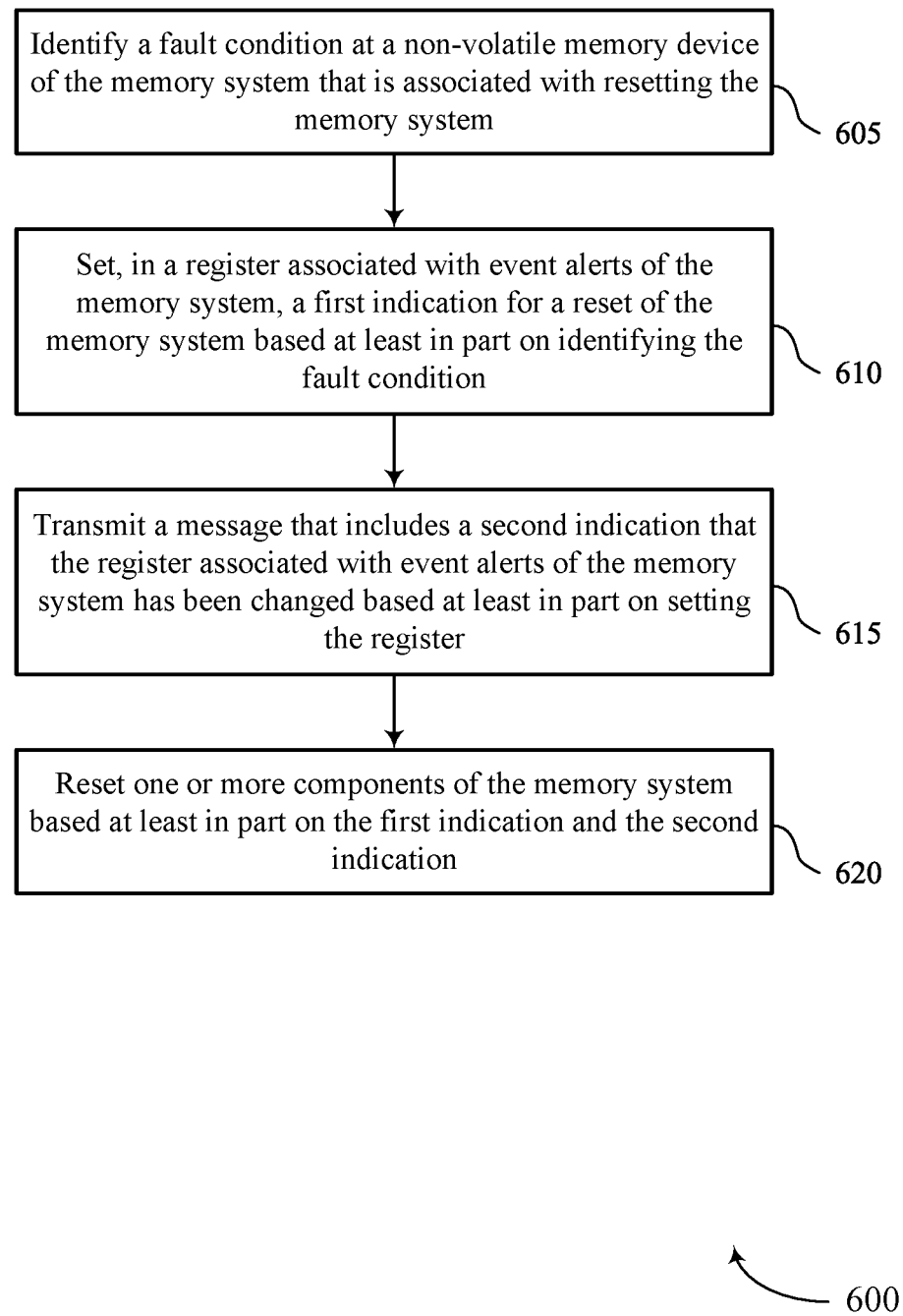
FIG. 6 shows a flowchart illustrating a method or methods that support device reset alert mechanism in accordance with examples as disclosed herein.

FIG. 6 shows a flowchart illustrating a method 600 that supports device reset alert mechanism in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, a fault condition may be identified. For example, the method may include identifying a fault condition at a non-volatile memory device of the memory system that is associated with resetting the memory system. The operations of 605 may be performed in accordance with examples as disclosed herein. In some examples, aspects of the operations of 605 may be performed by a fault condition component 525 as described with reference to FIG. 5.

At 610, a first indication may be set. For example, the method may include setting, in a register associated with event alerts of the memory system, a first indication for a reset of the memory system based at least in part on identifying the fault condition. The operations of 610 may be performed in accordance with examples as disclosed herein. In some examples, aspects of the operations of 610 may be performed by a bit component 530 as described with reference to FIG. 5.

At 615, a message may be transmitted. For example, the method may include transmitting a message that includes a second indication that the register associated with event alerts of the memory system has been changed based at least in part on setting the register. The operations of 615 may be performed in accordance with examples as disclosed herein. In some examples, aspects of the operations of 615 may be performed by a message transmitter 535 as described with reference to FIG. 5.

At 620, one or more components of the memory system may be reset. For example, the method may include resetting one or more components of the memory system based at least in part on the first indication and the second indication. The operations of 620 may be performed in accordance with examples as disclosed herein. In some examples, aspects of the operations of 620 may be performed by a reset component 540 as described with reference to FIG. 5.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for identifying a fault condition at a non-volatile memory device of the memory system that is associated with resetting the memory system; setting, in a register associated with event alerts of the memory system, a first indication for a reset of the memory system based at least in part on identifying the fault condition; transmitting a message that includes a second indication that the register associated with event alerts of the memory system has been changed based at least in part on setting the register; and resetting one or more components of the memory system based at least in part on the first indication and the second indication.

Aspect 2: The method, apparatus, or non-transitory computer-readable medium of aspect 1, further including operations, features, circuitry, logic, means, or instructions, or any combination thereof for storing parameter information about an operation of the memory system based at least in part on setting the first indication and before receiving a command from a host system to reset the memory system, where resetting the one or more components of the memory system is based at least in part on storing the parameter information.

Aspect 3: The method, apparatus, or non-transitory computer-readable medium of aspect 2 where storing the parameter information occurs before the memory system is reset.

Aspect 4: The method, apparatus, or non-transitory computer-readable medium of any of aspects 1 through 3 where a bit of the register associated with event alerts of the memory system is dedicated to indicating whether the memory system requests a host system to perform a reset of the memory system.

Aspect 5: The method, apparatus, or non-transitory computer-readable medium of aspect 4 where a first bit of the register is dedicated to requesting that a host system remove some resources from a physical memory resources pool serving a logical address space of logical units; a second bit of the register is dedicated to indicating that a capacity of a storage area associated with system data of the memory system is consumed; a third bit of the register is dedicated to indicating that a level of need associated with background operations of the memory system is above a threshold; a fourth bit of the register is dedicated to indicating that a temperature of the memory system is above a first threshold; a fifth bit of the register is dedicated to indicating that the temperature of the memory system is below a second threshold; a sixth bit of the register is dedicated to indicating that a capacity of a write booster is consumed; and a seventh bit of the register is dedicated to indicating that the memory system is operating at a reduced performance.

Aspect 6: The method, apparatus, or non-transitory computer-readable medium of any of aspects 1 through 5, further including operations, features, circuitry, logic, means, or instructions, or any combination thereof for receiving, from a host system, a second message requesting the memory system to transmit contents of the register associated with event alerts of the memory system to the host system, where resetting the one or more components is based at least in part on receiving the second message.

Aspect 7: The method, apparatus, or non-transitory computer-readable medium of aspect 6, further including operations, features, circuitry, logic, means, or instructions, or any combination thereof for transmitting, to the host system, a third message that includes the contents of the register based at least in part on receiving the second message, where resetting the one or more components is based at least in part on transmitting the third message.

Aspect 8: The method, apparatus, or non-transitory computer-readable medium of aspect 7, further including operations, features, circuitry, logic, means, or instructions, or any combination thereof for receiving, from the host system, a fourth message requesting that the memory system reset the one or more components based at least in part on transmitting the third message, where resetting the one or more components is based at least in part on receiving the fourth message.

Aspect 9: The method, apparatus, or non-transitory computer-readable medium of any of aspects 1 through 8, further including operations, features, circuitry, logic, means, or instructions, or any combination thereof for receiving, from a host system, a command to access one or more memory cells, where the fault condition prevents the command from being executed by the memory system, where transmitting the message includes transmitting a command response associated with the command, the command response including the second indication.

Aspect 10: The method, apparatus, or non-transitory computer-readable medium of any of aspects 1 through 9 where the message includes a response to a command pending at the memory system.

Aspect 11: The method, apparatus, or non-transitory computer-readable medium of any of aspects 1 through 10 where the one or more components reset by the memory system includes the non-volatile memory device.

Aspect 12: The method, apparatus, or non-transitory computer-readable medium of any of aspects 1 through 11 where the non-volatile memory device includes a NAND memory device.

Aspect 13: The method, apparatus, or non-transitory computer-readable medium of any of aspects 1 through 12 where the first indication requests that a host system perform the reset of the memory system.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory device; and
   a controller coupled with the memory device and configured to cause the apparatus to:
   identify a fault condition at a non-volatile memory device of a memory system that is associated with resetting the memory system;
   set, in a register associated with event alerts of the memory system, a first indication for a reset of the memory system based at least in part on identifying the fault condition;
   transmit, to a host system, a message that includes the first indication based at least in part on setting the register; and
   reset one or more components of the memory system based at least in part on the first indication.

2. The apparatus of claim 1, wherein the controller is further configured to cause the apparatus to:
   store parameter information about an operation of the memory system based at least in part on setting the first indication and before receiving a command from the host system to reset the memory system, wherein resetting the one or more components of the memory system is based at least in part on storing the parameter information.

3. The apparatus of claim 2, wherein storing the parameter information occurs before the memory system is reset.

4. The apparatus of claim 1, wherein a bit of the register associated with event alerts of the memory system is dedicated to indicating whether the memory system requests the host system to perform the reset of the memory system.

5. The apparatus of claim 4, wherein:
   a first bit of the register is dedicated to requesting that the host system remove some resources from a physical memory resources pool serving a logical address space of logical units;
   a second bit of the register is dedicated to indicating that a capacity of a storage area associated with system data of the memory system is consumed;
   a third bit of the register is dedicated to indicating that a level of need associated with background operations of the memory system is above a threshold;
   a fourth bit of the register is dedicated to indicating that a temperature of the memory system is above a first threshold;
   a fifth bit of the register is dedicated to indicating that the temperature of the memory system is below a second threshold;
   a sixth bit of the register is dedicated to indicating that a capacity of a write booster is consumed; and
   a seventh bit of the register is dedicated to indicating that the memory system is operating at a reduced performance.

6. The apparatus of claim 1, wherein the
   message includes contents of the register, wherein resetting the one or more components is based at least in part on transmitting the message.

7. The apparatus of claim 1, wherein the controller is further configured to cause the apparatus to:
   receive, from the host system, a second message requesting that the memory system reset the one or more components based at least in part on transmitting the message, wherein resetting the one or more components is based at least in part on receiving the second message.

8. The apparatus of claim 1, wherein the controller is further configured to cause the apparatus to:
   receive, from the host system, a command to access one or more memory cells, wherein the fault condition prevents the command from being executed by the memory system, wherein transmitting the message comprises transmitting a command response associated with the command.

9. The apparatus of claim 1, wherein the message comprises a response to a command pending at the memory system.

10. The apparatus of claim 1, wherein the one or more components reset by the memory system comprises the non-volatile memory device.

11. The apparatus of claim 1, wherein the non-volatile memory device comprises a NAND memory device.

12. The apparatus of claim 1, wherein the first indication requests that the host system perform the reset of the memory system.

13. A non-transitory computer-readable medium storing code comprising instructions which, when executed by a processor of an electronic device, cause the electronic device to:
    identify a fault condition at a non-volatile memory device of a memory system that is associated with resetting the memory system;

set, in a register associated with event alerts of the memory system, a first indication for a reset of the memory system based at least in part on identifying the fault condition;

transmit, to a host system, a message that includes the first indication based at least in part on setting the register; and reset one or more components of the memory system based at least in part on the first indication.

14. The non-transitory computer-readable medium of claim 13, wherein the instructions, when executed by the processor of the electronic device, further cause the electronic device to:

store parameter information about an operation of the memory system based at least in part on setting the first indication and before receiving a command from the host system to reset the memory system, wherein resetting the one or more components of the memory system is based at least in part on storing the parameter information.

15. The non-transitory computer-readable medium of claim 14, wherein storing the parameter information occurs before the memory system is reset.

16. The non-transitory computer-readable medium of claim 13, wherein a bit of the register associated with event alerts of the memory system is dedicated to indicating whether the memory system requests the host system to perform the reset of the memory system.

17. The non-transitory computer-readable medium of claim 16, wherein:

a first bit of the register is dedicated to requesting that the host system remove some resources from a physical memory resources pool serving a logical address space of logical units;

a second bit of the register is dedicated to indicating that a capacity of a storage area associated with system data of the memory system is consumed;

a third bit of the register is dedicated to indicating that a level of need associated with background operations of the memory system is above a threshold;

a fourth bit of the register is dedicated to indicating that a temperature of the memory system is above a first threshold;

a fifth bit of the register is dedicated to indicating that the temperature of the memory system is below a second threshold;

a sixth bit of the register is dedicated to indicating that a capacity of a write booster is consumed; and a seventh bit of the register is dedicated to indicating that the memory system is operating at a reduced performance.

18. The non-transitory computer-readable medium of claim 13, wherein the message includes contents of the register, wherein resetting the one or more components is based at least in part on transmitting the message.

19. A method performed at a memory system, comprising:

identifying a fault condition at a non-volatile memory device of the memory system that is associated with resetting the memory system;

setting, in a register associated with event alerts of the memory system, a first indication for a reset of the memory system based at least in part on identifying the fault condition;

transmitting, to a host system, a message that includes the first indication based at least in part on setting the register; and resetting one or more components of the memory system based at least in part on the first indication.

20. The method of claim 19, further comprising:

storing parameter information about an operation of the memory system based at least in part on setting the first indication and before receiving a command from the host system to reset the memory system, wherein resetting the one or more components of the memory system is based at least in part on storing the parameter information.

21. The method of claim 20, wherein storing the parameter information occurs before the memory system is reset.

22. The method of claim 19, wherein a bit of the register associated with event alerts of the memory system is dedicated to indicating whether the memory system requests the host system to perform the reset of the memory system.

23. The method of claim 22, wherein:

a first bit of the register is dedicated to requesting that the host system remove some resources from a physical memory resources pool serving a logical address space of logical units;

a second bit of the register is dedicated to indicating that a capacity of a storage area associated with system data of the memory system is consumed;

a third bit of the register is dedicated to indicating that a level of need associated with background operations of the memory system is above a threshold;

a fourth bit of the register is dedicated to indicating that a temperature of the memory system is above a first threshold;

a fifth bit of the register is dedicated to indicating that the temperature of the memory system is below a second threshold;

a sixth bit of the register is dedicated to indicating that a capacity of a write booster is consumed; and a seventh bit of the register is dedicated to indicating that the memory system is operating at a reduced performance.

* * * * *